June 21, 1966 K. C. RIPLEY 3,256,847
MULTIPLY COMPARTMENTED PASSIVE STABILIZER
Filed March 6, 1964 7 Sheets-Sheet 1
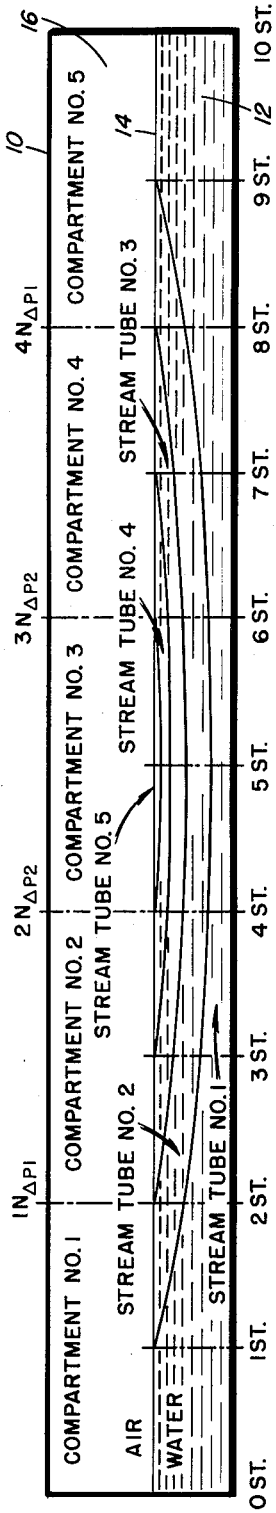
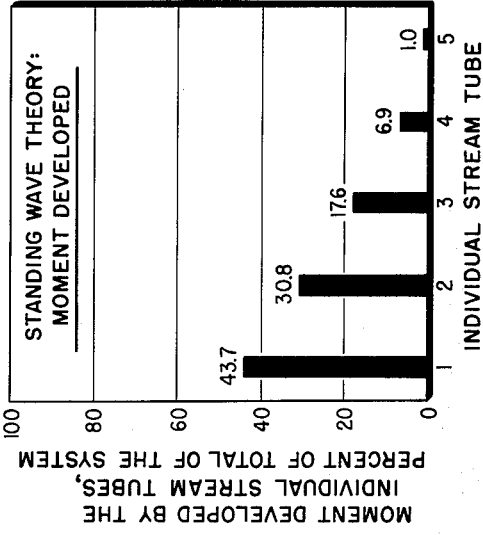
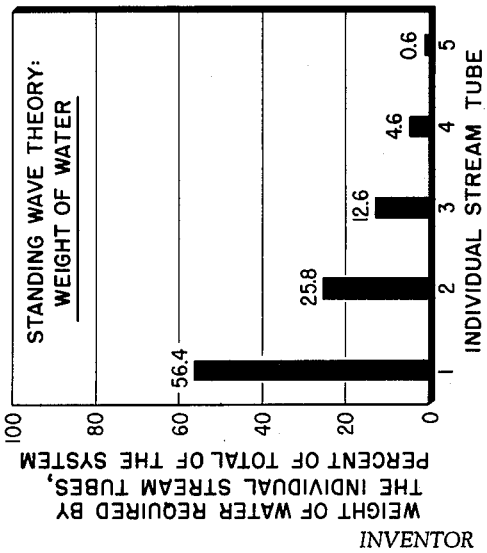
INVENTOR
Kenneth C. Ripley
BY
Stevens, Davis, Miller & Mosher
ATTORNEYS June 21, 1966     K. C. RIPLEY     3,256,847
MULTIPLY COMPARTMENTED PASSIVE STABILIZER
Filed March 6, 1964     7 Sheets-Sheet 2
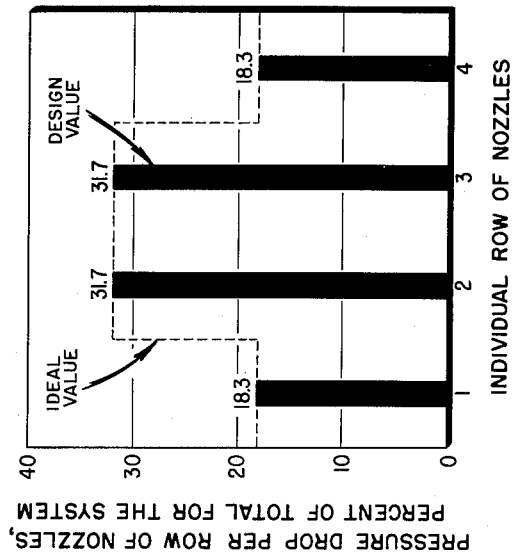
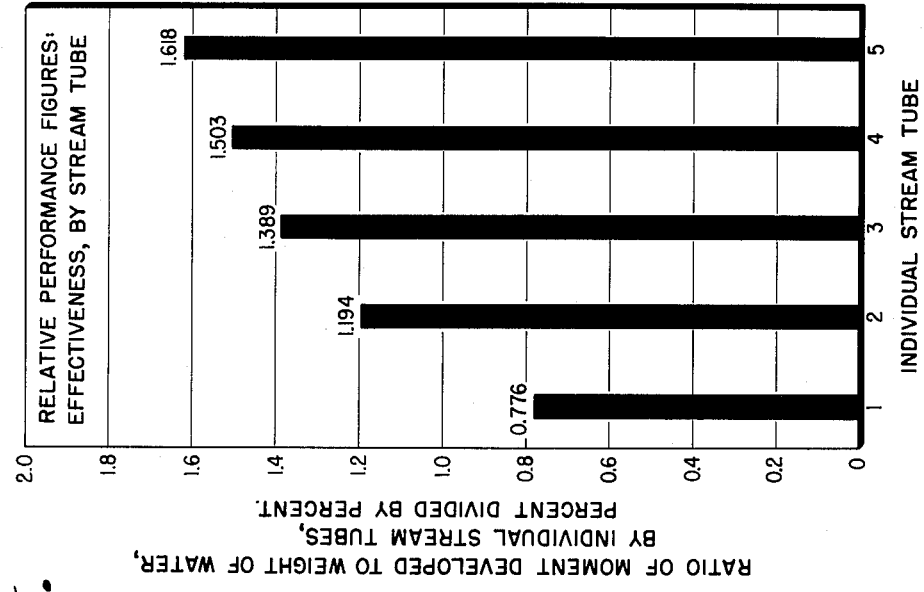
INVENTOR
Kenneth C. Ripley
BY Stevens, Davis, Miller & Mosher
ATTORNEYS

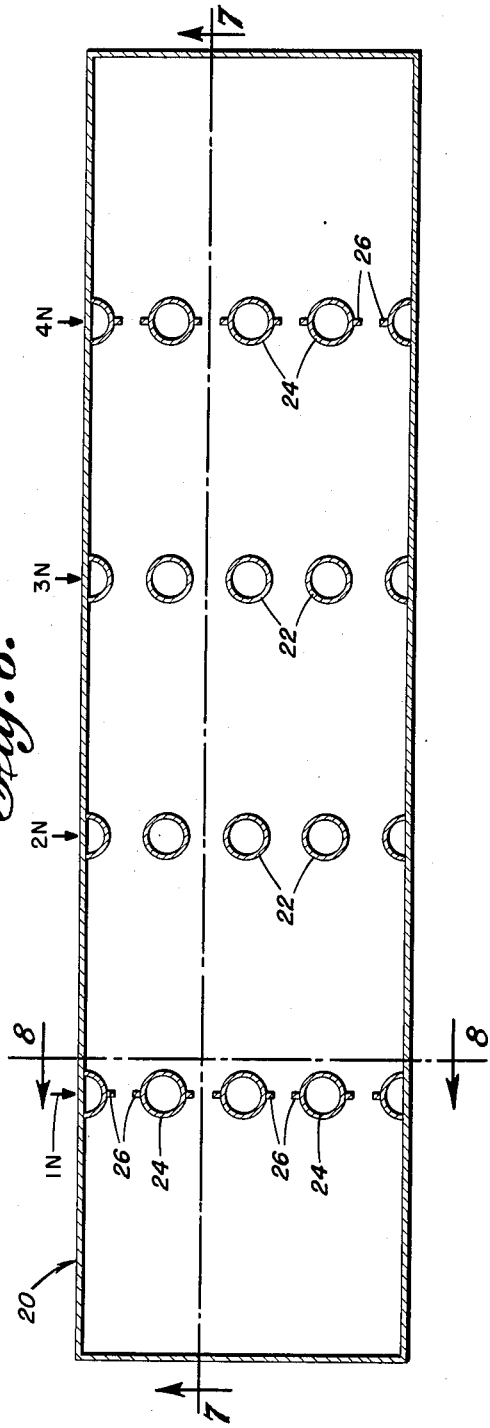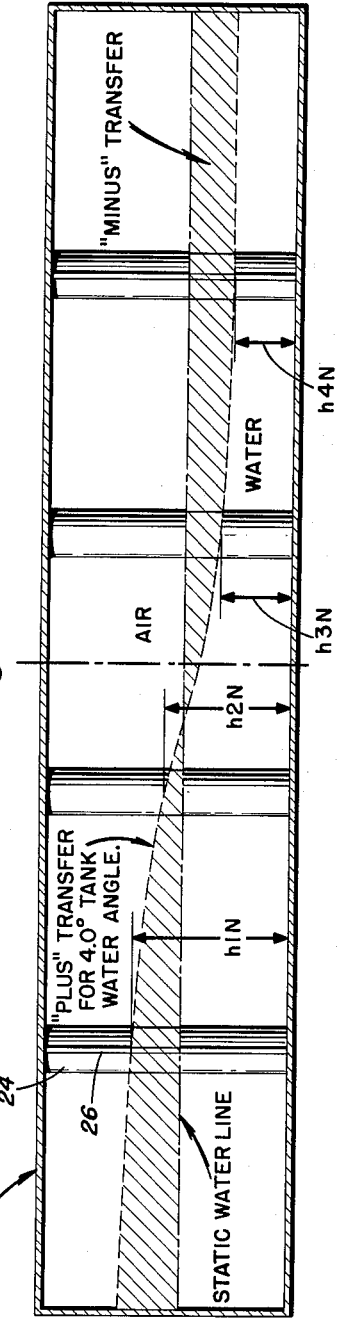

June 21, 1966 K. C. RIPLEY 3,256,847
MULTIPLY COMPARTMENTED PASSIVE STABILIZER
Filed March 6, 1964 7 Sheets-Sheet 4
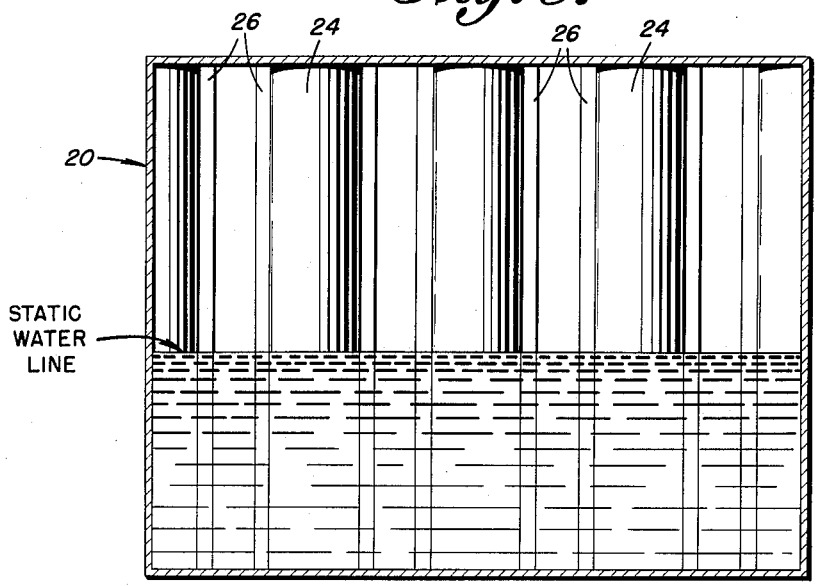
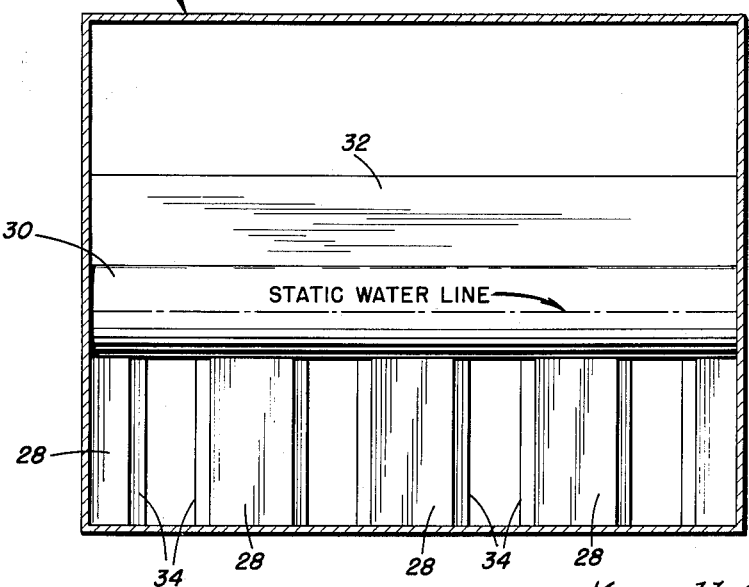
INVENTOR
Kenneth C. Ripley
BY Stevens, Davis, Miller & Mosher
ATTORNEYS

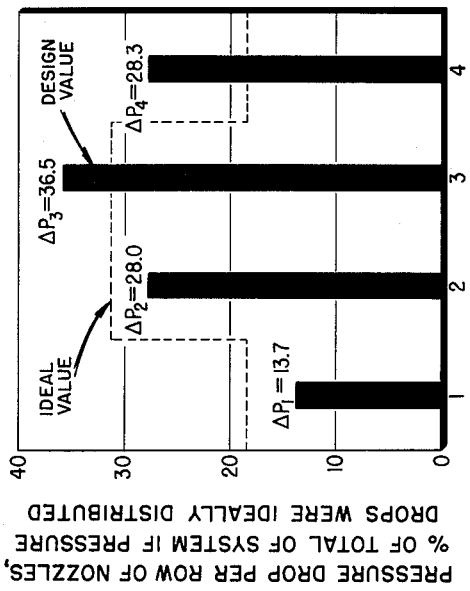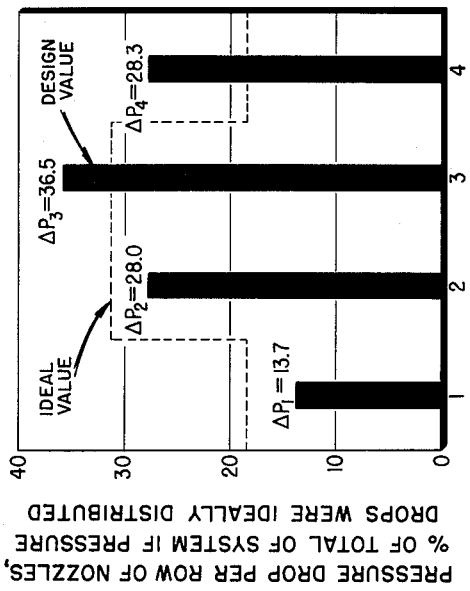

June 21, 1966 K. C. RIPLEY 3,256,847
MULTIPLY COMPARTMENTED PASSIVE STABILIZER
Filed March 6, 1964 7 Sheets-Sheet 6
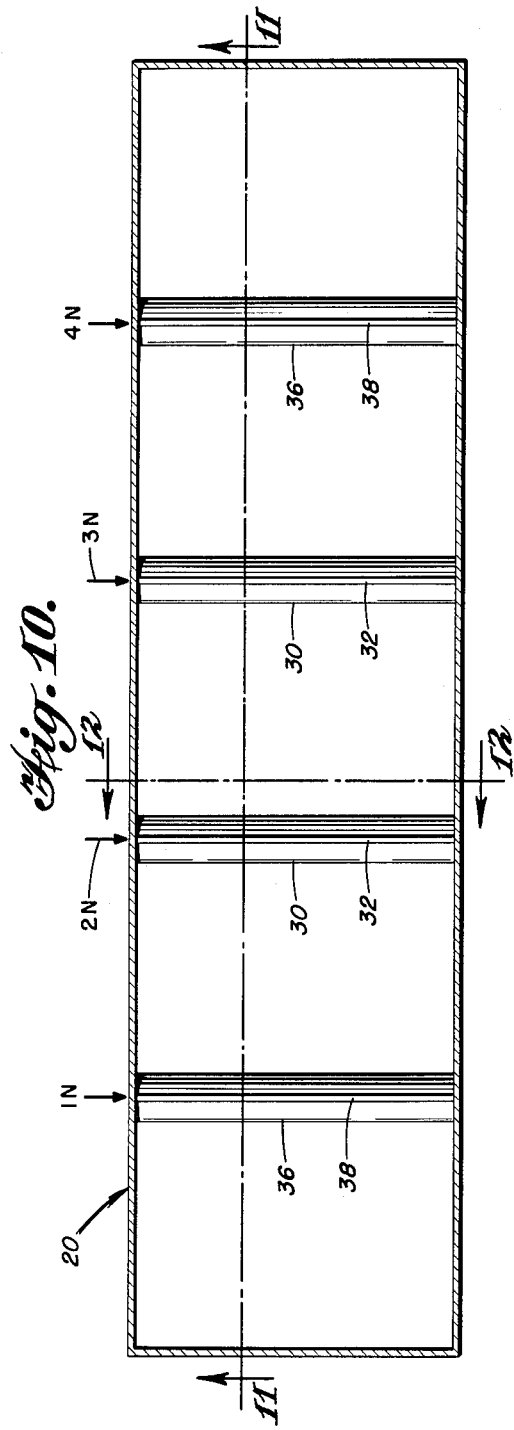
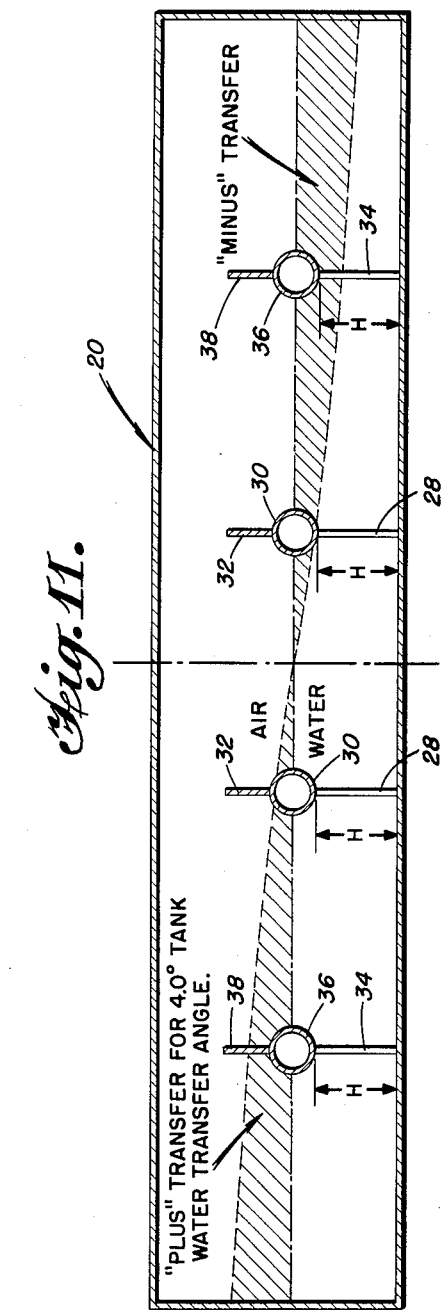
INVENTOR
Kenneth C. Ripley
BY Stevens, Davis, Miller & Mosher
ATTORNEYS June 21, 1966 K. C. RIPLEY 3,256,847
MULTIPLY COMPARTMENTED PASSIVE STABILIZER
Filed March 6, 1964 7 Sheets-Sheet 7

INVENTOR
Kenneth C. Ripley

BY Stevens, Davis, Miller & Mosher
ATTORNEYS

United States Patent Office 3,256,847
Patented June 21, 1966

3,256,847
MULTIPLY COMPARTMENTED PASSIVE
STABILIZER
Kenneth Clay Ripley, Washington, D.C., assignor to John
J. McMullen Associates, Inc., New York, N.Y., a corporation of New York
Filed Mar. 6, 1964, Ser. No. 350,065
4 Claims. (Cl. 114—125)

This invention relates to a passive stabilizer and more particularly a tank-like stabilizer which defines a plurality of compartments, said tank being filled with a liquid which develops restoring moments to the object or vehicle to be stabilized. This invention comprises an improvement on the stabilizer systems of U.S. Patent 3,054,373 issued September 18, 1962, and the U.S. patent application Serial No. 201,476, now Patent No. 3,160,136, filed June 11, 1962, by Kenneth C. Ripley.

The first passive stabilizer of distinct U-tube type is that patented by Herman Frahm in 1910, U.S. Patent No. 970,368. This is the first stabilizer designed on the principle of having a damped resonator in the form of a U-tube, said U-tube being proportioned so that its natural frequency is equal to, or substantially equal to, the natural frequency of roll of the unstabilized ship.

Having the natural frequency of a stabilizer tuned to respond most strongly at the frequency substantially equal to the roll of the ship is an ideal characteristic for a passive stabilizer. This characteristic is desirable for two reasons. First, part of the roll of a ship at any instant represents forced roll, and the degree of this forced roll would never be large except that ships not fitted with a roll stabilizer system have very little damping to resist said roll. Therefore, the only effective moments that can resist this excitation imparted to the ship at resonant frequency are the damping moments. Secondly, such forced roll as develops from instant to instant must exist concurrently with such free roll as is present from instant to instant, and the quenching of free roll at the ship's resonant frequency is most effective when a passive restoring moment is generated. Said moment is a pure damping moment.

The Frahm invention consisted of recognizing, for the first time, that the successful passive stabilizer is one which stabilizes the ship by removing energy of roll from the ship with some degree of efficiency. But, the development of the art showed the Frahm system to have four shortcomings. These shortcomings are as follows:

(1) The Frahm system required a submerged cross-connection between the tanks.

(2) The Frahm system required continuing adjustments in control of the stabilizer during service.

(3) The Frahm system used aerodynamic throttling instead of hydrodynamic throttling.

(4) The Frahm system does not provide structure for suppressing high-frequency swash flow within the wing tanks, and therefore, said high-frequency forces representing wing tank resonance were imparted to the ship.

There has been an attempt in the past to reduce the size of the wing tanks as a means to limit the amount of swash therein by raising the frequency of liquid movement within the individual wing tanks to such a level that the ship would not respond thereto or, alternately, so that high-frequency forces imparted to the ship will not excite high-frequency waves within the wing tanks. However, because the cross-connection between the wing tanks is caused to be disproportionately large in comparison to the size of the wing tanks, the resultant design was uneconomical. Hence, the designer was faced with the problem that when a sufficiently large passive stabilization system was designed for a ship, there was the resulting undesirable "quivering" forces imparted to the ship due to the local resonant fluid movement at the free surface of the liquid within the wing tanks.

A period of approximately fifty years passed between the issuance of the basic Frahm patent in 1910 and the time when a passive tank installation was made that represented the first decisive break with the U-tube tradition as had been laid down by Frahm. The new stabilizer was said to be of the flume type, and was installed on a U.S. Pacific Missile Range ship, the Private Joe E. Mann (Navy Case No. 28,712, filed 16 February, 1960; issued as U.S. Patent No. 3,054,373, September 18, 1962). This new stabilizer utilized a different concept from the Frahm system and enabled a passive stabilizer system to be more economical, efficient, and controllable than the Frahm system. The flume type system utilized the following innovations:

(1) *Open-channel type cross-connection.*—This system consists of two wing tanks and one cross-section, the upper liquid surface of which is a free surface throughout. The system can be analyzed by what is called the "U-tube analogy."

(2) *Completely unattended control.*—By the use of computers, it was discovered by the inventor that if the flume type stabilizer was tuned to the natural frequency of the ship, the non-linear (velocity squared) damping which is encountered in hydrodynamic systems would be sufficient to afford stabilization of good magnitude in even the most severe seaway. Thus, the cumbersome and unreliable aerodynamic throttling of the Frahm system was eliminated with the coming of the open channel condition of the flume type system.

(3) *The innovation of having a silent passive tank stabilizer.*—The Frahm system is said to have been almost painfully noisy at sea due to the aerodynamic throttling utilized therein. This one characteristic of the Frahm system, more than any other, may account for the system's non-use and the lack of experimentation with passive type systems. However, since the flume type system uses an open channel condition throughout, and hydrodynamic damping, the free passage of air between compartments enables the entire system to operate quietly.

The original flume type passive tank was a system that consisted of but three compartments, namely, the two wing tanks and a cross-section. This system was adopted at that time because it could be analyzed by means of the "U-tube analogy"—which was derived as an accommodation of available theory (Frahm theory) to the problem of the flume type passive tank. In this analogy, each wing tank is treated as though it were one leg of a U-tube, and the cross-connection is treated as though it were a submerged duct. In subsequent designs of flume type passive tanks, the designs were less inflexible in the number of compartments permitted per stabilizer unit. With time, the number of compartments per stabilizer unit had increased first to four, and then to five, six, and even more, compartments per unit. However, it has been found that when these compartments are indiscriminately dimensioned, undesirable results, such as the following, can occur:

(1) Excitation of higher frequency waves within individual compartments.

(2) Neutralization of a compartment whereby the fluid cooperates with less than the total number of compartments instead of being affected by the system as a whole.

(3) A varying phase angle between the "plus" and "minus" transfers (defined below) due to the lack of a true standing wave profile.

As the number of compartments per stabilizer unit is increased without limit, the system approaches more and more closely that of a passive tank stabilizer the profile of transfer of which is without discontinuities when flow through the nozzles has momentarily ceased. Now, the design determines, obviously, what the profile of transfer will be, but a particular profile has especial interest, and this is that of a damped, standing wave.

The standing wave is one which, like the progressive wave, has been given exact mathematical formulation. The equations of transfer (the horizontal and the vertical displacements as a function of time $t$ and of distance $x$ along the undisturbed water line) are of unique practical interest for the design of free-surface passive tank stabilizers. This is so for the following three reasons:

(1) *The merit of having an unambiguous natural frequency.*—The standing wave has a definite natural frequency $\omega_T$, given by the equation:

$$\omega_T = \sqrt{(\pi g/B)\tanh(\pi h/B)}, \quad (1)$$

where $g$ is the constant of gravity, $h$ is the static water depth, and B is the dimension of the rectangular tank in the direction of the standing wave. This frequency is used to express the fact that the standing wave is harmonic throughout its length B. When $y_x$ is the instantaneous vertical displacement at any station $x$, and $y_{Max.}$ is the amplitude of $y_x$ for $x$ equal to zero, the equation for $y_x$ is:

$$y_x = \left(y_{Max.} \cos \frac{\pi x}{B}\right) \sin \omega_T t \quad (2)$$

Equations 1 and 2 tell us that the free surface counterpart to the U-tube is the standing wave. This is so because the standing wave and the U-tube are alike in that each has its own, unambiguous natural frequency.

(2) *The merit of having equalized "plus" and "minus" transfer, independent of the amplitude of transfer, up to a transfer $y_{Max.}$ equal to the static water depth h.*—A "plus" transfer denotes the rise of water level at any arbitrarily selected station $x$, for some specified value of transfer per side. A "minus" transfer thus denotes the fall of water level at the station opposite thereto, for the same value of transfer per side. Equation 2 above is the form of the equation for "plus" and "minus" transfer when the profile of transfer is that for a standing wave. The equation as written is seen to give equalized "plus" and "minus" transfer, independent of the station $x$, the amplitude of transfer $y_{Max.}$, and the time $t$. The derivation of Equation 2 does restrict what value the transfer $y_x$ may take; however, it is desirable to have a system that places no such restriction on $y_x$ up to $y_{Max.}$ which should not exceed the static water depth $h$. Again, it is seen that the standing wave stabilizer is the free surface counterpart to the U-tube stabilizer, because no discrepancy between "plus" and "minus" transfer can exist, with either stabilizer. The same statement is only approximately true for the flume type stabilizer as this stabilizer was originally conceived. The experimentally derived curves for transfer into and out of a wing tank showed that the "plus" transfers tended to be somewhat larger than the corresponding "minus" transfers. Any such difference could signify that some of the transfer going into a "plus" transfer was at the expense of a net transfer from the cross-connection itself. In the case of the Frahm, submerged duct, any such net transfer from the cross-connection cannot occur, but with the flume type cross-connection, such net transfer can occur, to some degree.

(3) *The merit of having a transfer which shows no discontinuity of profile at any point (at the instant when direction of flow is being reversed).*—The standing wave as treated in books on fluid mechanics is a system with almost no internal damping: this is so because the viscosity of water is a very small quantity, as used to calculate Reynolds number. It is possible to imagine a standing wave the internal damping of which has been increased until any free oscillation would be very quickly quenched. Consider, for instance, the mathematical abstraction of imagining the number of rows of nozzles for introducing internal damping increased without limit, that is, to infinity. In the limit, therefore, the wave profile obtained will be without discontinuity, and will represent a heavily damped, standing wave. This elimination of all discontinuity at the nozzle stations means that the throat cross-sectional area at a nozzle station and the channel cross-sectional area at the nozzle station are one and the same. This will not be so in the practical cases, of using some finite number of rows of nozzles per tank. In the practical cases, the fact of discontinuity of profile must be recognized, and the effect of this on transfer taken into account, for a full understanding of what can, and does happen, with passive tanks which only approximately yield a true standing wave as the profile of transfer.

With the discovery of this basic knowledge about the standing wave profile, the question became, how can a practical passive stabilizer system with a finite number of rows be constructed to yield the desirable heavily damped, standing wave. It must be understood that the heavily damped, standing wave is a mathematical abstraction, a system that if realized would represent ultimate performance in a passive stabilizer tank. One of the primary purposes of this invention is the solution to the above problem: to yield said heavily damped, standing waves while using a finite number of rows of nozzles in the system.

Another object of the invention is to devise a method for designing a passive stabilizer tank by using the basic concept of a damped standing wave and to discard the "U-tube analogy" concept as now found in the prior art.

Another object of the present invention is to use the continuously compartmented passive stabilizer tank as the concept of producing the heavily damped, standing wave. This new concept is used to approximate the ideal conditions for a heavily damped, standing wave.

Another object of the present invention is to recognize the small, but finite, discontinuities of profile of water transfer during operation of the passive stabilizer tank and to modify the continuously compartmented tank to any desired degree of approximation to eliminate said discontinuities.

It is another object of the invention to provide a stabilizer tank which uses the entire top liquid surface as a free surface.

It is a further object of the invention to provide a passive stabilizer wherein all parts of the free surface liquid therein develop restoring moment which is imparted to the object being stabilized.

It is still another object of the invention to provide a passive stabilization system containing a predetermined volume of liquid in an entirely free surface condition, said stabilization system causing said volume of liquid to assume a substantially true standing wave so that maximum effectiveness of the stabilizer system is developed for said volume of liquid.

Another object of the present invention is to provide a passive stabilizer containing a given volume of liquid, said stabilizer comprising a plurality of submerged rows of nozzles for distributing the energy damping forces throughout the system so that a standing wave profile for the transferring fluid is preserved, notwithstanding finite transfer within the tank.

Other and further objects of the invention will become apparent when the following detailed description is read in view of the appended drawings in which:

FIG. 1 is a schematic representation of a front elevation of a passive tank containing a predetermined amount of water therein. Also illustrated therein is a plurality of stream tubes for the liquid within the tank;

FIG. 2 is a graph showing the percentage of the total of weight of water required by the individual stream tubes;

FIG. 3 is a graph showing the restoring moment developed by each individual stream tube on a percentage basis;

FIG. 4 is a graph showing the ratio of the moment developed by each individual stream tube to the weight of water within that stream tube;

FIG. 5 is a graph showing the ideal and the proposed design values of pressure drop for each row of nozzles in an example of a five-compartment tank;

FIG. 6 is a top plan view of the stabilizer tank with the rows of nozzles arranged in accordance with the values as set forth in FIG. 5;

FIG. 7 is a sectional elevation taken along lines 7—7 of FIG. 6;

FIG. 8 is a sectional view taken along lines 8—8 of FIG. 6;

FIG. 9 is a graph showing the actual pressure drops at the individual rows of nozzles for the system as shown in FIGS. 6–8;

FIG. 10 is a top plan view of a continuously compartmented stabilizer tank which is modified to account for the finite transfer of fluid within the tank and the plus and minus transfer effects thereof;

FIG. 11 is a sectional view taken along lines 11—11 of FIG. 10;

FIG. 12 is a sectional view taken along lines 12—12 of FIG. 10; and

FIG. 13 is a graph showing the improved distribution of pressure drops at the individual rows of nozzles for the system shown in FIGS. 10–12.

Figure 14:
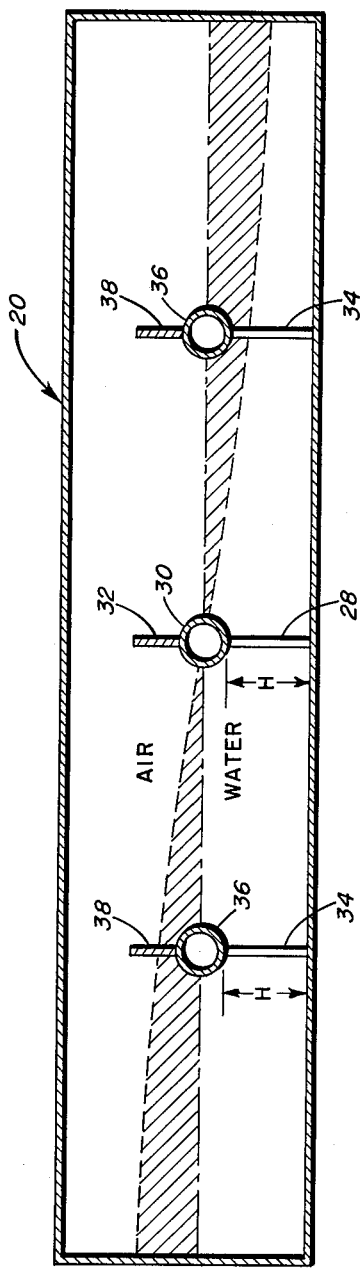
FIGURE 14 is a sectional view similar to FIGURE 11 of yet another exampled embodiment of the present invention. Like reference characters refer to like structures as shown in FIGURE 11.

Referring now to FIG. 1, there is illustrated a passive stabilizer tank generally indicated as 10 containing a known volume of water 12, said water having a static water level 14. Although water is used as the fluid medium throughout the present specification, it is to be understood that any equivalent fluid can be substituted therefor without departing from the spirit of the invention, said equivalent fluids, for example, being oil or fuel or the like. As illustrated in FIG. 1, the water 12 has a free surface which communicates with a volume of air 16 or any other gaseous medium.

It is common knowledge in the art that if a tank containing fluid, such as that shown in FIG. 1, is periodically oscillated to some degree at a frequency that corresponds to the natural undamped period of the fluid transfer within the tank, a standing wave represented by the fluid will result within the tank. The development of the fluid mechanics art is such that the "streamlines" of a standing wave can be plotted and computed; for example, see the basic equations on page 41 of "Water Waves," by Stoker, 1957, Interscience Publishers, Inc., New York. A "streamline" is defined as an imaginary line across which there is no velocity component. A "stream tube" is defined as that which is generated by the streamlines through every point on a closed contour.

Therefore, it can be seen in FIG. 1 that there exists a plurality of stream tubes numbered 1–5 within the stabilizing tank 10. These stream tubes are calculated for an undamped standing wave represented by water 12. It will be noted that the respective stations of termination of a stream tube at the free surface of fluid 12 have been identified from 0ST through 10ST. It will also be observed that the cross-sectional area of stream tube 1, for example, decreases from location 2ST through 3ST to 5ST and increases from 5ST through 6ST to 9ST. Thus, as the standing wave is being developed, there is fluid transfer through a nonconstant cross-sectional area for each individual stream tube. This characteristic holds for all stream tubes including tubes numbered 2, 3, 4 and 5. It should be mentioned that the illustrated stream tubes have been plotted by dividing the free surface length of water 12 into equal increments and then determining the respective boundary streamline which connects the associated stations 1 and 9, 2 and 8, 3 and 7, and 4 and 6.

Each of the stream tubes of FIG. 1 can be integrated for the purpose of finding the portion of total weight of water required of a particular stream tube up to the static water line. These are the quantities plotted in FIG. 2. It will be noted from FIG. 2 that stream tube 1 contains the largest percentage of fluid by weight, stream tube 2 contains the next largest amount of fluid and so on progressively down to stream tube 5, which contains the least amount of fluid.

As the tank 10 shown in FIG. 1 is oscillated and a fluid transfer takes place through stream tubes 1–5 and a standing wave in said tank 10 is developed, it is possible to compute the portion of the total moment of the stabilizer contributed by each of the respective stream tubes. This calculation, however, is correct only for an infinitesimal amplitude of transfer of fluid within tank 10. The respective restoring moments of fluid are plotted in FIG. 3. The moments represented therein represent the percent of total moment that each stream tube contributes due to the infinitesimal transfer of fluid therein.

Inspection of FIGS. 2 and 3 will show that the stream tube 1 requires a greater weight of water for development of its contribution to moment than any other stream tube. This finding is true not only for absolute weight of water required, but for weight of water required per unit of moment developed as well. For instance, this particular stream tube develops 43.7 percent of the total moment, but requires 56.3 percent of the total weight. The efficiency of each individual stream tube therefore can be calculated and also expressed as a percent. This has been done and the results are plotted in FIG. 4. It can be seen that stream tube 1 has an effective percentage of 77.6 percent while stream tube 5 has an effective percentage of 161.8 percent.

The foregoing findings establish an important principle for guidance in the design of the passive stabilizer tank. This principle is that no stabilizer will be more effective or efficient than one using a fluid the entire surface of which is free surface, that is, open to the air or the like. This important finding based on mathematical data shows that no Frahm-like passive tank, such as one with some portion of the cross-connection submerged, can be as economical of weight and space as a comparable full free-surface passive tank.

The system thus far considered is one where the only damping provided is that due to the viscosity of the water, said damping being unaided by any other means. Without additional means, the system does not qualify as a passive stabilizer tank because the energy into the system exceeds the energy absorbed by the system. For the system to qualify as a passive stabilizer tank, it is necessary to introduce means which functions to greatly increase the damping of the fluid motion within the tank. Furthermore, for the system to be efficient to the maximum extent, it is necessary that the stream tubes for the standing waves be preserved notwithstanding the introduction of damping means.

As an example of damping means mounted within the stabilizer tank, let it be assumed that a plurality of rows of nozzles are mounted within tank 10. The introduction of the rows of nozzles as damping means will alter the stream tubes only locally, that is, in the vicinity of the rows of nozzles.

Since any number of rows of nozzles can be incorporated into the system and since each row of nozzles defines the boundary of a compartment, the passive stabilizer tank 10 is said to be (effectively) continuously compartmented, the actual number of compartments only depending on the needs of the system.

The foregoing problem of energy dissipation is solved when the dissipation of energy by each stream tube as integrated over any quarter cycle has been made to be exactly equal to the input of energy to the stream tube as integrated over the same quarter cycle. For the purpose of the following example, let us assume that tank 10 is divided into five compartments with four rows of nozzles located respectively at stations 1N, 2N, 3N and 4N. With this particular arrangement, stream tubes numbers 1 and 2 are combined and can be treated as one stream tube, stream tubes 3 and 4 can be combined and handled as another separate stream tube, and stream tube number 5 is considered by itself. It can therefore be seen that the fluid transfer through stream tubes 1 and 2 passes through all four rows of nozzles, while stream tubes 3 and 4 only pass through the inner two rows of nozzles and stream tube number 5 passes through no rows of nozzles. The question now becomes, how much pressure drop, which is related to energy dissipation, is required to take place at each respective row of nozzles? Calculations for the solution of the above problem can be begun by recognizing that there is only one unknown for the stream tubes numbers 3 and 4, that is, the required pressure drop $\Delta P_2$ at the row of nozzles numbered 2N, which is equal to the required pressure drop at the row of nozzles numbered 3N. This required pressure drop $\Delta P_2$ can thus be calculated from considering stream tubes number 3 and 4 alone and on the bases of the stipulation that the stream tubes between rows of nozzles shall have been preserved. The integration of energy into stream tubes over a quarter cycle must equal the energy dissipated at the nozzles over the same quarter cycle. Therefore, the cross-sectional areas of the nozzles can be determined. With the pressure drop $\Delta P_2$ known, and valid for stream tubes numbers 1 and 2 as well, it is possible to consider now stream tubes numbers 1 and 2 alone for finding the remaining unknown, which is the pressure drop $\Delta P_1$ at the row of nozzles 1N equal to the pressure drop $\Delta P_1$ at the row of nozzles 4N. When $\Delta P_1$ has been determined in this manner, the ratio of $\Delta P_1$ over $\Delta P_2$ is found to have a unique value. The unique value follows logically because of the requirement of the assumption that there is no distortion of the stream tubes in the spaces away from local influence of the rows of nozzles. With no distortion of the stream tubes, there can be no distortion of the profile of transfer from that of a standing wave. For the case considered, that of infinitesimal transfer, the problem of how to introduce damping has been solved.

Referring now to FIGS. 6–9, there is illustrated a passive stabilizer tank 20 having four rows of nozzles and five compartments constructed on the basis of the calculations found above. It will be recalled that the above calculations were for an infinitesimal fluid transfer. Again, there are four rows of nozzles 1N through 4N located at equal distances between the ends of the stabilizer tank 20. The inner rows of nozzles 2N and 3N comprise a plurality of spaced pipes 22, the distances between said pipes defining a cross-sectional area on the basis of the percentage of pressure drop indicated for rows 2 and 3 of FIG. 5. In this particular example, each row of nozzles defining rows 2 and 3 are designed to establish 31.7 percent of the pressure drop for the fluid transfer within stream tubes 1 and 2. Rows 1N and 4N are similarly constructed; however, each pipe has a vertical flange mounted on opposite ends thereof to aid in the defining of the cross-sectional area between said flanges so that each of rows 1N and 4N establishes the pressure drop which is 18.3 percent of the total for the same stream tubes 1 and 2.

In operation, when the stabilizer tank 20 is oscillated to some degree about a central axis, the stabilizing moment in the form of a standing wave represented by the fluid within the tank tends to form. However, instead of having an energy or pressure drop distribution as that shown in the ideal situation in graph in FIG. 5, the actual pressure drop distribution is that as shown in FIG. 9. As is evident from the graph of FIG. 9, the left hand rows 1N and 2N actually establish less than the ideal value, and the right hand rows of nozzles 3N and 4N provide for a greater pressure drop than the ideal values. If all $\Delta P$'s are added, it can be seen that $\Sigma \Delta P$ is somewhat greater than 100% and therefore the system is overdamped.

The effect of such undesirable pressure drop distribution is that the stream tubes and streamlines represented in FIG. 1 are distorted and the standing wave profile of the fluid within tank 20 is destroyed. Thus, when a real system is built using the ideal values for infinitesimal fluid transfer as disclosed in FIGS. 2–5, there results an undesirable distribution of pressure drop along with the absence of a true standing wave profile.

Consequently, the system must be modified to compensate for the finite or actual transfer of fluid because of the inherent limitations of the system.

In searching for a solution of the above problem, it can be seen that for a positive or plus transfer of fluid above the static water line, the cross-sectional area of fluid passage varies in proportion to the height of the fluid at a particular row of nozzles. Thus, for a finite plus transfer at stations 1N and 2N, the actual cross-sectional area through which the fluid is allowed to flow is greater than the cross-sectional area provided when the fluid is in a static state. This increase in cross-sectional area accounts for the fact that the damping at stations 1N and 2N is less than the ideal percentages. Conversely, the cross-sectional area for the negative transfer appearing at stations 3N and 4N is less than that defined by the static water line; and consequently, the damping or $\Delta P$ experienced at stations 3N and 4N is greater than the ideal values. This fact is borne out by an inspection of the graph of FIG. 9.

To compensate for this situation, stabilizer tank 20 is modified as shown in FIGS. 10–12. As seen in those figures, submerged nozzles are arranged and defined by vertical plates 28 and transversely, horizontally disposed tube members 30. Upstanding vertical flange members 32 are mounted above pipes 30 to prevent water flow over the top of pipe 30. The outer stations 1N and 4N are similarly defined with plates 34, pipes 36 and flanges 38; however, the respective cross-sectional areas between plates 28 are somewhat greater than the cross-sectional areas between plates 34 to provide for the correct $\Delta P$.

In operation, the cross-sectional area at all stations 1N through 4N remains constant due to the "submerged" nozzle arrangement defined by the plates 28, 24 and pipes 30 and 36 respectively. Furthermore, plates 32 and 38 prevent an overflow of fluid over pipes 30 and 36 respectively. Thus, any transfer that takes place must be through a cross-sectional area which is constant. Thus, the damping, foot-pounds per second, at the plus transfer side of the tank are increased (from the infinitesimal case) because the cross-sectional area is held constant and a greater $\Delta P$ takes place on the plus transfer side of the tank due to the greater transfer. With the ideal $\Delta P$ being dissipated at the plus transfer side of the tank, the ideal $\Delta P$ is dissipated at the minus transfer side as well, so that the close approximation shown in FIG. 13 is achieved. Note that the $\Sigma \Delta P$ is slightly more than 100%; however, it is much closer to 100% than the $\Sigma \Delta P$ of FIG. 9. This fact means that the system is more nearly critically damped for a finite transfer than when the infinitesimal transfer values were used. $\Sigma \Delta P$ is slightly over 100% in the present example because the orifice of station number 4 became uncovered during a portion of the quarter cycle under consideration.

When low magnitude rolls are encountered, the cross-sectional areas at rows 1N and 4N will remain covered and constant. However, when large magnitude rolls are encountered, the nozzles in rows 1N and 4N may become uncovered near the end of the respective quarter cycle, but since the velocity of the liquid is practically zero when the uncovering takes place, this event will have little effect on the respective $\Delta P$'s and the overall $\Sigma \Delta P$. Hence, the restoring moment and standing wave profile will not significantly be affected by an uncovering.

The result of this nearly perfect distribution of $\Delta P$ between the four stations is that the streamlines and stream tubes of a theoretically undamped standing wave will now be preserved and that the *actual* fluid transfer within the passive stabilizer tank 20 will now represent a standing wave profile. Thus, the ideal (maximum)

stabilizing moment is developed by the stabilizer for a completely passive system.

It is to be understood that as many compartments and rows of nozzles can be introduced into the system in accordance with the needs of the art without departing from the spirit of this invention. However, the cross-sectional areas found at respective stations of nozzles is to be calculated so that the proper energy dissipation will result so that the streamlines and stream tubes of the theoretical standing wave are preserved. For example, FIGURE 14 illustrates a stabilizer with four compartments and three rows of nozzles with one row of nozzles located at the centerline of tank 20. The open areas at the nozzles are indicated in the same manner as set forth above for the embodiment of FIGURE 11.

The present invention is a significant improvement over the conventional three-compartment system as now found in the art because the plurality of compartments within the stabilizer tank (1) provides a system which is designed to operate with each compartment contributing its predetermined required share of the restoring moment, (2) suppresses interference developed within a single compartment, (3) enables departure from the old concept of the U-tube analogy for designing passive stabilizer systems, (4) provides a novel structural design to enable achievement of the desired results.

It is to be further understood that other and further modifications can be made to the passive stabilizer system without departing from the spirit and concepts of the basic invention. Therefore, the scope of the present invention should only be limited by the appended claims.

What is claimed is:

1. A passive ship stabilizer comprising an elongated tank and a body of liquid partially filling said tank, a plurality of members defining restricted openings mounted within said tank and spaced axially along the longitudinal dimension of said tank, each opening defined by said members having a dimension related to its distance from center of the longitudinal tank dimension, one of said openings being located at the center of said tank and being dimensioned to impart a predetermined first degree of damping to a first volume of liquid which transfers through it only such that said first volume assumes a standing wave profile, said first degree of damping being imparted to all other volumes transferring through said center opening, two of said openings each spaced from and positioned on opposite sides of said center opening and each being dimensioned to impart a predetermined second degree of damping to a second volume of liquid which transfers through said two openings and said center opening only such that said second volume of liquid assumes a standing wave profile due to the first and second degrees of damping imparted thereto, said two openings imparting the second degree of damping to all other volumes of liquid passing through said two openings, whereby a first stabilizing moment is developed within the compartments between said center opening and said two openings, and a second stabilizing moment is developed within the compartments outside said two openings.

2. A passive ship stabilizer comprising an elongated tank and a body of liquid partially filling said tank, a plurality of members defining restricted openings mounted within said tank and spaced axially along the longitudinal dimension of said tank, each opening defined by said members having a dimension related to its distance from center of the longitudinal tank dimension, the two innermost openings being dimensioned to impart a predetermined first degree of damping to a first volume of liquid which transfers through them only such that said first volume assumes a standing wave profile, said first degree of damping being imparted to all other volumes transferring through said two innermost openings, the two second innermost openings being dimensioned to impart a predetermined second degree of damping to a second volume of liquid which transfers through said two innermost and two second innermost openings only such that said second volume of liquid assumes a standing wave profile due to the first and second degrees of damping imparted thereto, said two second innermost openings imparting the second degree of damping to all other volumes of liquid passing through said second two innermost openings, whereby a first stabilizing moment is developed within the compartment between the two innermost openings, a second stabilizing moment is developed within the compartments between the two innermost and two second innermost openings, and a third stabilizing moment is developed within the compartments outside said two second innermost openings.

3. A stabilizer as set forth in claim 2, wherein said members comprise elongated vertical elements arranged in rows across said tank to define said openings.

4. A passive stabilizer as set forth in claim 2, wherein said members define a plurality of submerged nozzles when the liquid within said tank is in a static condition.

References Cited by the Examiner

UNITED STATES PATENTS

| 1,007,348 | 10/1911 | Frahm | 114—125 X |
| 3,054,373 | 9/1962 | Ripley | 114—125 |
| 3,160,136 | 12/1964 | Ripley | 114—125 |

OTHER REFERENCES

Ser. No. 132,695, Hort (A.P.C.), published May 11, 1943.

MILTON BUCHLER, *Primary Examiner.*

FERGUS S. MIDDLETON, *Examiner.*

T. M. BLIX, *Assistant Examiner.*